United States Patent [19]

King et al.

[11] Patent Number: 5,761,455

[45] Date of Patent: Jun. 2, 1998

[54] DYNAMIC BUS RECONFIGURATION LOGIC

[75] Inventors: Edward C. King, Pleasanton; Alan G. Smith, Dublin; James C. Lee, San Francisco, all of Calif.

[73] Assignee: CPU Technology, Inc., Fremont, Calif.

[21] Appl. No.: 384,293

[22] Filed: Feb. 6, 1995

[51] Int. Cl.$^6$ .................................................. G06F 13/14
[52] U.S. Cl. .......................... 395/307; 395/477; 395/475; 395/495
[58] Field of Search ................................. 395/800, 307, 395/303, 311–312, 474–480, 728–732

[56] References Cited

U.S. PATENT DOCUMENTS

| | | | |
|---|---|---|---|
| 4,652,993 | 3/1987 | Scheuneman et al. | 395/478 |
| 4,688,168 | 8/1987 | Gudaitis et al. | 364/DIG. 2 |
| 4,807,184 | 2/1989 | Shelor | 395/311 |
| 5,202,970 | 4/1993 | Schiffleger | 395/475 |
| 5,239,654 | 8/1993 | Ing-Simmons et al. | 395/800 |
| 5,247,637 | 9/1993 | Leedom et al. | 395/475 |
| 5,388,243 | 2/1995 | Glider et al. | 395/475 |
| 5,463,755 | 10/1995 | Dumarot et al. | 395/475 |
| 5,471,592 | 11/1995 | Gove et al. | 395/200.03 |
| 5,481,727 | 1/1996 | Asano et al. | 395/477 |
| 5,559,970 | 9/1996 | Sharma | 395/312 |

*Primary Examiner*—Ayaz R. Sheikh
*Attorney, Agent, or Firm*—Philip H. Albert; Townsend and Townsend and Crew LLP

[57] ABSTRACT

A parallel processing system is provided with a plurality of processors and a plurality of memories, and bus units with arbitration coupling the processors and memories. A bus unit provides a pathway between one processor and the bus unit's respective memory. Each bus unit arbitrates multiple simultaneous access requests for its respective memory and communicates its decisions to other bus units so that a memory access requiring multiple memories will only occur if all those memories are available. The coupling of processors to memories can change, dynamically, each bus cycle without the need for setup before the bus cycle either by pipelining or having unused bus cycles. In a specific embodiment, the memory access information is provided on high order address lines, where the processor logically accesses different memory address spaces to make different accesses, thereby sharing memory with other processors.

15 Claims, 2 Drawing Sheets

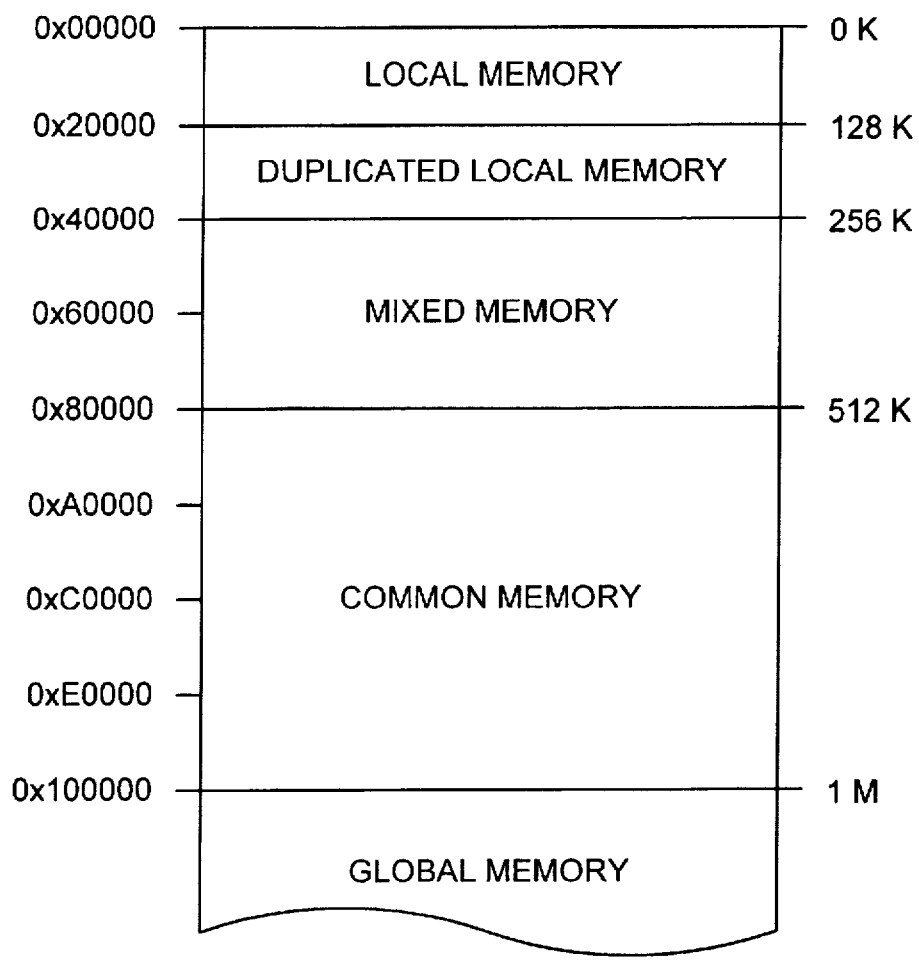
Fig. 2 Address Space for Processor $P_i$

DYNAMIC BUS RECONFIGURATION LOGIC

BACKGROUND OF THE INVENTION

The present invention is related to the field of computer architecture and organization and, more particularly, to the high speed operation and synchronization of computer processor units operating in parallel.

Parallel computers have been found to be ideal for solving certain types of problems. A general goal for parallel computing is to have N processors, where N is an integer greater than 1, perform a task N times as fast as one processor. In practice, this ideal performance is not possible, since some overhead for inter-processor coordination is required. This overhead is not present in the single processor situation, since one processor operates in series and read/writes data from one memory space, never having to contend with another process for access to a contended memory space.

In parallel processing systems, each processor typically spends a high percentage of time fetching and executing its own instructions and operating on its own local data. A fast, private memory is ideal for holding local instructions and data. However, each processor must also be able to send and receive data from the other processors in the system. A common approach to providing inter-processor communications is to use a shared memory. The shared memory provides a convenient programming mechanism for passing data between processors, but requires that all processors that share the memory be coupled to the memory. This introduces a bottleneck which reduces performance. If the shared memory is set up with a narrow port width, too much contention occurs between the processors for the memory. However, if the memory has too large a port width, then much of the available bandwidth to memory is wasted if each processor only needs a portion of the width to access memory.

In the typical processing system, the bottleneck which limits processing speed is the interface between the processor and memory. This lead to the invention of on-chip memory caching and other schemes to limit the time a processor has to wait for memory. Of course, memory access can be made faster by increasing the width of the bus between the processor and the memory. However, this leads to a higher pin count where the processor and memory are not on the same chip.

Therefore, a system is needed for coupling processors and memories efficiently without introducing additional bottlenecks, to allow processors in a multi-processor system to access memories with a minimum of contention and a maximum use of the available ports to the memories.

SUMMARY OF THE INVENTION

The present invention provides for a parallel processing computer system where a plurality of processors access a plurality of memories. Each memory is coupled to a respective bus unit and the bus units are each coupled to all of the processors. The respective bus unit provides a pathway between one processor and its respective memory. Each bus unit arbitrates multiple simultaneous access requests for its respective memory and communicates its decisions to other bus units over arbitration signalling lines so that a memory access requiring multiple memories will only occur if all those memories are available. A processor provides a bus unit signals which indicate which memory is being requested, an address, and data if the access is a write access. These signals are provided all in one processor bus cycle, thus eliminating the need for multiple processor cycles for a memory access, regardless of how often the rearrangement of pathways between the various processors and various memories occur.

In a specific embodiment, the memory access information is provided on high-order address lines. Logically, the processor accesses different memory address spaces to make different accesses. An added benefit of this arrangement is that multiple processors can share memory by accessing memory which is common to each processor's memory address space.

In one particular embodiment, the system includes four processors, four memories and pathways 16, 32 or 64 bits wide are created and reconfigured dynamically each processor clock cycle. Each processor accesses a preferred memory with a 16 bit pathway for purely local accesses, a mixed memory shared between two processors with a 32 bit pathway, and a common memory shared by all four processors with a 64 bit pathway. If the local, mixed, and common memory physically overlap, a set of compiler constraints can be imposed on programs written for the processors to avoid physical overlap of memory space used under one memory with memory space used under another mode.

Other particular embodiments are also possible, such as eight or sixteen processors and memories. Of course, the number need not be a power of two, and the number of processors and memories need not be the same.

With this arrangement, each processor's bus width to memory is variable, multiple accesses can occur in a single bus cycle, and memory is easily shared, without a delay for bus setup.

BRIEF DESCRIPTION OF THE DRAWINGS

A clearer understanding of the present invention may be achieved by reading the following description of specific embodiments with reference to the following drawings:

FIG. 2 is a logical diagram of the address space of a processor in the computer system shown in FIG. 1.

DESCRIPTION OF PREFERRED EMBODIMENT (S)

Figure 1:
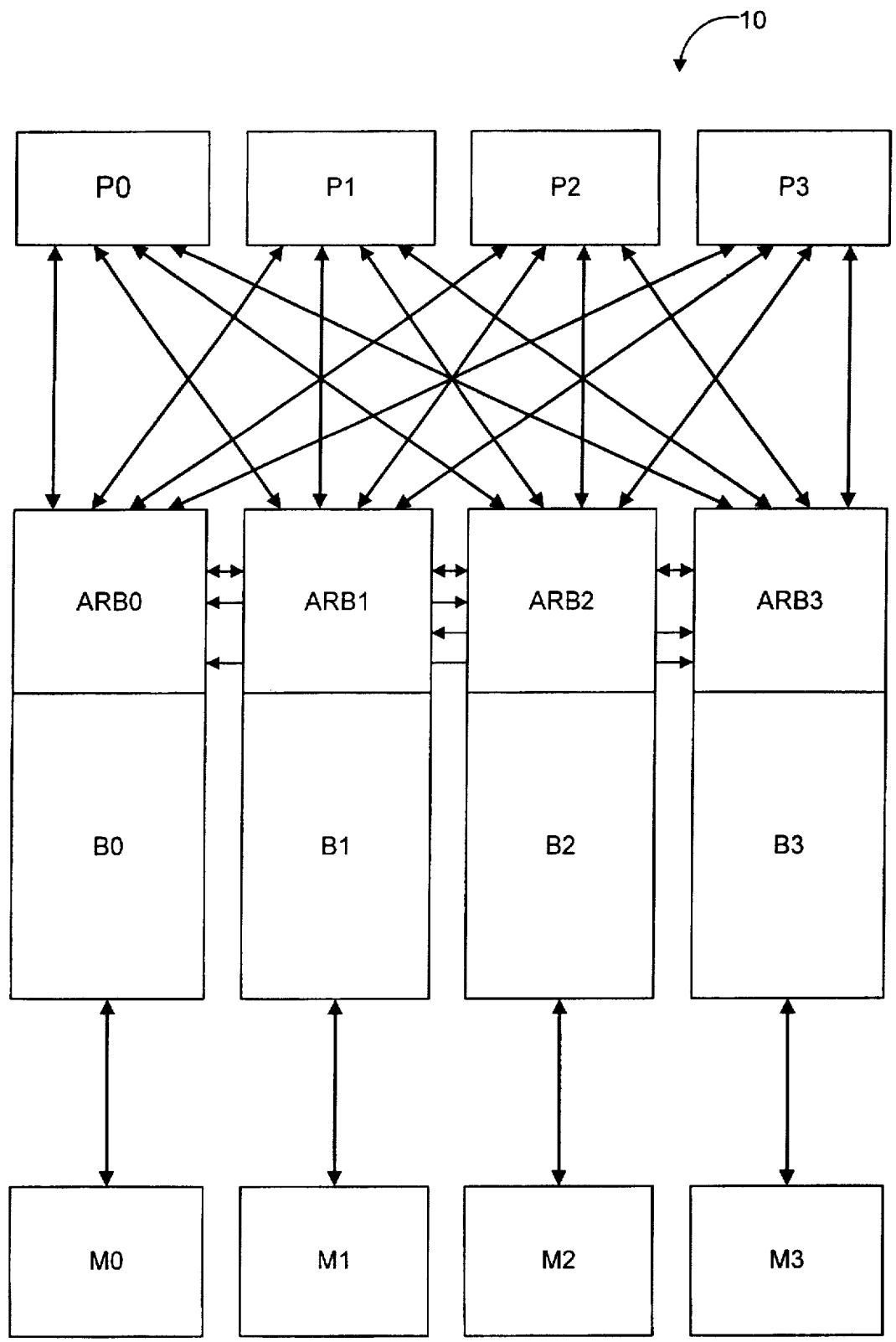
FIG. 1 is a general block diagram of a computer system with multiple processors and multiple memories according to the present invention, as might be implemented in one or more integrated circuits.

FIG. 1 is a block diagram of a parallel processing system 10. System 10 is shown with four processors (P0, P1, P2, P3), four memories (M0, M1, M2, M3), and four bus units B0, B1, B2, B3) and their respective arbitration units (ARB0, ARB1, ARB2, ARB3). Interconnections for individual memory busses, processor busses and arbitration signals are also shown.

A memory bus connects a memory and its respective bus unit. The memory bus includes address lines to address a location in the memory, data lines to provide pass write data and read data therebetween, a read/write signal line, and other signal and control lines as necessary.

A processor bus connects one processor to one bus unit. FIG. 1 shows each of the four processors connected to each of the four bus units, resulting in sixteen processor busses. Of course, in many implementations each processor bus is not fully duplicated and sixteen processor busses are only a logical construct. A processor bus includes address lines on which the processor indicates the desired memory location, memory selection lines (which are high order address lines in the embodiment described herein), data lines, and control lines as needed including means for communicating a wait signal from the bus unit to the processor. The wait signal is necessary when two processors (or more) request access to the memory controlled by one bus unit; that bus unit will arbitrate the requests, granting only one and denying the rest; the wait signal is sent to those lower-priority processors whose requests were denied.

The arbitration signals are communicated between arbitration units to indicate to other arbitration units, as needed, that a processor has been granted priority for a bus unit.

In the specific embodiment shown in the figures, the four memories each store 128 kilobytes (K) of data (one byte is 8 bits), with two bytes per memory address on the memory bus, spanning a memory with 16-bit addressing.

FIG. 2 shows each processor's address space. The address space is divided into local memory (0–128 K), a duplication of the local memory (128–256 K), mixed memory (256–512 K), common memory (512 K–1 M) and global memory (above 1 M). Global memory is memory which is not shown in FIG. 1 and is not accessed through the bus units.

A one megabyte memory space for each of four processors and only 512 K total memory is possible because the memory spaces overlap. If processor Pi (where i is one of 0, 1, 2 or 3) requests an access with an address between 0 and 128 K, it accesses only Mi (via Bi). If processor P0 requests an access with an address between 256 K and 512 K, it accesses M0 and M1. For mixed memory space, P1 would also access M0 and M1, while P2 and P3 would both access M2 and M3. If processor Pi requests an access with an address between 512 K and 1 M, it accesses the common memory formed by M0, M1, M2 and M3.

Local memory is so named because a processor does not expect any other processor to access it, although each processor has access to it as part of the common memory. Compiler constraints can keep a processor from using an area of common or mixed memory which is the same physical memory as memory used as local memory by another processor. Because of this mapping of the memory space, the type of memory access can be easily determined by bits 19:18 of the address provided on the processor Pi's address lines. Table 1 shows the correspondence between those bit lines and the type of memory access.

TABLE 1

| Address Bit | | | Access Type | Address Shift | Bits Used for Access | Address Range |
|---|---|---|---|---|---|---|
| 19 | 18 | 17 | | | | |
| 0 | 0 | 0 | Local | 1 | 16:1 | 128 K |
| 0 | 0 | 1 | Local (Dup) | 1 | 16:1 | 128 K |
| 0 | 1 | X | Mixed | 2 | 17:2 | 256 K |
| 1 | X | X | Common | 3 | 18:3 | 512 K |

A local memory access is 16 bits, the width of a single memory, the width of a mixed mode access is 32 bits and a common mode access is 64 bits. Since each memory (M0, M1, M2, M3) is a fixed two bytes wide, the bus units shift the address received from a processor by one position for mixed memory and by two positions for common memory. Because of the assignment of the memory types to these memory address ranges, decoding the type of memory address (i.e., the width of the bus) is easily performed, although it leaves the address space between 128 K and 256 K unused. In the simplest system, the local memory is duplicated in that address space.

Suppose the following typical series of operations occur. In a first bus cycle, suppose processor P0 needs to make a local memory access and the other three processors do not need a memory access in this first bus cycle. Processor P0 places an address between 0 K and 128 K on the processor bus between processor P0 and bus unit B0. Seeing no other processors contending for M0, bus unit B0 couples P0 to M0 for the current bus cycle.

In a second cycle, suppose processor P0 needs to make a common memory access, and the other three processors still do not need memory access. This type of address is a 64 bit wide access, and thus the address will be an even multiple of 4 (because each address at the processor addresses exactly two bytes). Processor P0 places an address between 512 K and 1 M on each of its processor busses (i.e., bit 19 of the address is a "1"). Each bus unit is configured to respond to access requests with bit 19 set, so each of them check for contention, and finding none, allow the accesses to occur. Each bus unit will then shift the address bits down by two positions, moving bits 17:2 to bits 15:0, and apply the address to the bus unit's respective memory. Table 2 shows which bus units respond to which types of memory access from which processors.

TABLE 2

| Processor | Access Type | Bus Units Used and Data Bits Provided by Each |
|---|---|---|
| P0 | Local | B0 (bits 15:00) |
| | Mixed | B0 (bits 15:00), B1 (bits 31:16) |
| | Common | B0 (bits 15:00), B1 (bits 31:16), B2 (bits 47:32), B3 (bits 68:63) |
| P1 | Local | B1 (bits 15:00) |
| | Mixed | B0 (bits 15:00), B1 (bits 31:16) |
| | Common | B0 (bits 15:00), B1 (bits 31:16), B2 (bits 47:32), B3 (bits 68:63) |
| P2 | Local | B2 (bits 15:00) |
| | Mixed | B2 (bits 15:00), B3 (bits 31:16) |
| | Common | B0 (bits 15:00), B1 (bits 31:16), B2 (bits 47:32), B3 (bits 68:63) |
| P3 | Local | B3 (bits 15:00) |
| | Mixed | B2 (bits 15:00), B3 (bits 31:16) |
| | Common | B0 (bits 15:00), B1 (bits 31:16), B2 (bits 47:32), B3 (bits 68:63) |

Because of this arrangement of addresses and bus units, processor P0 is able to switch from a 16 bit wide memory access to a 64 bit wide access without an extra bus cycle for setup and without providing advance notice of the change.

Suppose now in a third bus cycle, both processor P0 and P3 request a common memory access (by each setting their address line 19 to "1"). Since every bus unit is active for a common memory access, they each arbitrate two requests. The bus units must all agree, since neither processor will find a partial access to be suitable. However, the arbitration units ARB0–ARB3 prioritize among themselves, then the highest priority arbitration unit selects one of the processor requests, communicates the selection to the other arbitration units over the arbitration signaling lines, and the winning processor accesses all four memories are processor P0 did in the second bus cycle. A wait signal is communicated to the losing processor by one or all of the bus units.

Typically, the losing processor will wait and rerequest the access in the following bus cycle. So that the processor doesn't have to wait possibly forever, a round robin priority scheme could be used, where priority goes to the least recently active processor. Alternatively, the processors could be assigned fixed priorities, or at least fixed for the duration of a task. The latter is particularly useful where a processor runs a short, but time critical routine and is given the highest priority for the duration of the routine. This ensures that the processor will not wait for a bus cycle.

Suppose in a fourth bus cycle, processor P1 requests a mixed access (by setting its address lines 19:18 to "01") and processor P2 requests a local access (by setting its address lines 19:18 to "00"). By virtue of the present invention, these two accesses can occur simultaneously. Bus units B0 and B1 pick up the request from processor P1 and bus unit B2 picks up the request from processor P2. Since no bus unit is being contended for, they each allow the requested access. Again, the busses between the processors and the memories are reconfigured for each bus cycle.

In the fourth bus cycle, bus units B0 and B1 shift the address provided by processor P1 by one position so that address lines 16:1 from the processor go to address lines 15:0 of memories M0 and M1.

If a processor bus is a 32 bit address bus, then bits 31:20 determine if the dynamically-sized memory shown in FIG. 1 is used at all (if it is, these bits are all "0") and bits 19:18 determine the width of the access.

While examples of arbitration are described above, other arbitration schemes are also possible. For example, local accesses can be given higher priority than common accesses and processors given relative priority for the case where two processors contend for a single mixed access, local accesses can be given lower priority than common accesses, or other scheme which provides optimum usage of the memories.

Of course, a processor which loses an arbitration is free to read the data coming out of a bus unit, as might be the case for processors coupled to form a SIMD or MIMD parallel processor (Single Instruction-Multiple Data or (Multiple Instruction-Multiple Data, respectively). A SIMD parallel processor, as the name indicates, is a machine where each processor operates using the same instructions, but operates on different data. Finite element analysis is an example application, where a model is divided into small elements and sets of these elements are manipulated by each processor. The manipulation is the same for each set of elements, but the data is different for each processor. In a MIMD parallel processor, each processor runs an independent set of instructions on independent sets of data. As should be apparent, memories M0–M3 can be instruction memories, data memories, or both. Furthermore, since the bus reconfiguration is dynamic, the parallel processing system 10 shown in FIG. 1 is easily capable of switching between a SIMD mode and a MIMD mode without any intervening clock cycles for setup.

In summary, using the present invention, bus units are provided between processors and memories to arbitrate and translate memory access requests such that the memory access busses are reconfigurable each bus cycle, memory can be shared among processors, and multiple simultaneous memory accesses can occur.

While the above is a complete description of the preferred embodiments of the present invention, various alternatives, modifications and equivalents may be used. It should be evident that the present invention is equally applicable by making appropriate modifications to the embodiment described above. Therefore, the above description should not be taken as limiting the scope of invention which is defined by the metes and bounds of the appended claims.

What is claimed is:

1. A memory bus control circuit for handling a plurality of dynamic memory access pathways in a system with a plurality of processors and a plurality of memories, wherein a dynamic memory access pathway is characterized by an assignment of address lines, data lines and control lines between a processor of the plurality of processors and a memory of the plurality of memories for the transfer of data between the processor and the memory, the memory bus control circuit comprising:

a plurality of pathway control units, interposed between the plurality of memories and the plurality of processors, wherein each specific pathway control unit of the plurality of pathway control units is coupled to a respective memory of the plurality of memories; and a pathway resource allocator, coupled to the plurality of pathway control units, which assigns a pathway control unit to a processor for memory access as requested by the processor, including logic to allocate more than one pathway control unit to more than one processor in a given memory access cycle when multiple processors request memory access to less than all of the plurality of pathway control units, wherein the concatenation and allocation of pathway units to processors is controlled by additional address lines from each processor which specify a pathway data width, and wherein the pathway resource allocator allows multiple concurrent accesses when at least one processor requests less than all of an available pathway data width and at least two processors request a memory access.

2. The memory bus control circuit of claim 1, wherein said pathway resource allocator is a dynamic resource allocator which assigns pathway control units according to assignments which are changeable for each memory access cycle.

3. The memory bus control circuit of claim 2, wherein multiple pathway units are dynamically concatenated to provide higher bandwidth memory accesses, thereby allowing the concatenation of pathways to change for each memory access cycle.

4. The memory bus control circuit of claim 2, wherein concatenated pathway units increase a pathway data width for a memory access cycle.

5. The memory bus control circuit of claim 1, wherein the plurality of processors is four processors, the plurality of memories is four memories, a dynamic memory access pathway uses 16 bits of address lines and 16 bits of data lines, and a pathway data width is one of 16, 32 or 64 bits.

6. The memory bus control circuit of claim 1, wherein the additional address lines form a redundant memory space for processors, whereby a processor specifies a different concatenation of pathways by accessing different processor address spaces.

7. The memory bus control circuit of claim 6, wherein more than one processor shares a single memory space.

8. The memory bus control circuit of claim 1, wherein the pathway resource allocator further comprises an arbitration unit for resolving contention between multiple processors for access to a single memory.

9. The memory bus control circuit of claim 8, wherein the arbitration unit comprises logic for prioritizing conflicting memory access requests from more than one processor according to a number of pathways concatenated by the request, with requests requiring more pathways having priority over requests requiring fewer pathways.

10. The memory bus control circuit of claim 8, wherein the arbitration unit comprises logic for prioritizing conflicting memory access requests from more than one processor according to a fixed priority assigned to each processor of the plurality of processors.

11. The memory bus control circuit of claim 8, wherein the arbitration unit comprises logic for prioritizing conflicting memory access requests from more than one processor to grant the memory access request of the processor with a longest period of not being granted a memory access request.

12. The memory bus control circuit of claim 1, herein addresses of the plurality of memories are logically arranged to provide address spaces for more than one processor which map to a common range of memory locations in the plurality of memories.

13. A multi-processor computer, comprising:

a plurality of processors;

a plurality of memories;

a plurality of pathway control units, each pathway control unit controlling read and write access to one memory of the plurality of memories;

a resource allocator, coupled to the pathway control units and the plurality of processors, for allocating access to the pathway control units as requested by processors, the resource allocator operating on control signals provided for a current access clock cycle and comprising:

a first circuit for determining a pathway data width requested by each processor making an access request for a current access clock cycle, wherein each processor specifies a particular pathway data width using address lines from the processor;

a second circuit for prioritizing processor requests for the current access clock cycle, including logic for allowing multiple accesses in the current access clock cycle where more than one processor requests less than all of an available pathway data width provided by the plurality of memories;

a third circuit for coupling a processor granted an access request to a memory requested by the processor, wherein coupling for each access clock cycle is independent of coupling for prior access clock cycles.

14. A method for memory access of a plurality of memories by a plurality of processors, comprising the steps of:

allocating a unique processor address space to each possible pathway data width;

issuing a request from a processor for a memory access, the request including an indication of a requested pathway data width and address, thereby indicating a requested pathway data width by a subset of address lines;

prioritizing requests from processors for memory access to determine a request to be granted in an access clock cycle;

if multiple processors request an access for the access clock cycle and the requested pathway data widths and addresses are such that they do not overlap, granting multiple requests to multiple processors for the access clock cycle;

coupling processors with memories as indicated by the granted access requests in the access clock cycle.

15. The method of claim 14, wherein the accesses are modifiable each access clock cycle.

* * * * *